United States Patent
Wheeler et al.

(10) Patent No.: US 10,594,935 B2
(45) Date of Patent: Mar. 17, 2020

(54) ALONG TRACK FLAT OPTICAL LENS IMAGING DEVICE

(71) Applicant: SPECTRUM OPTIX INC., Calgary, Alberta (CA)

(72) Inventors: Carey J. Wheeler, Whitewater, CO (US); John Daugela, Calgary (CA)

(73) Assignee: SPECTRUM OPTIX INC., Calgary, Alberta (CA)

( * ) Notice: Subject to any disclaimer, the term of this patent is extended or adjusted under 35 U.S.C. 154(b) by 0 days.

(21) Appl. No.: 15/952,048

(22) Filed: Apr. 12, 2018

(65) Prior Publication Data

US 2018/0302558 A1    Oct. 18, 2018

Related U.S. Application Data

(60) Provisional application No. 62/484,827, filed on Apr. 12, 2017.

(51) Int. Cl.
| | |
|---|---|
| *H04N 5/232* | (2006.01) |
| *G02F 1/29* | (2006.01) |
| *G02B 17/08* | (2006.01) |
| *G06T 3/00* | (2006.01) |
| *H04N 5/357* | (2011.01) |

(52) U.S. Cl.
CPC ......... *H04N 5/23238* (2013.01); *G02B 17/08* (2013.01); *G02F 1/29* (2013.01); *G06T 3/0018* (2013.01); *H04N 5/23229* (2013.01); *H04N 5/3572* (2013.01)

(58) Field of Classification Search
CPC ........... H04N 5/23238; H04N 5/23229; H04N 5/3572; G01S 3/00; G02B 17/08
See application file for complete search history.

(56) References Cited

U.S. PATENT DOCUMENTS

| | | | |
|---|---|---|---|
| 2004/0061774 A1* | 4/2004 | Wachtel | G03B 19/00 348/36 |
| 2007/0097206 A1* | 5/2007 | Houvener | G03B 35/08 348/26 |
| 2010/0213355 A1 | 8/2010 | Wang et al. | |

(Continued)

OTHER PUBLICATIONS

International Search Report dated Jul. 31, 2018 for corresponding PCT Application No. PCT/US2018/027355 (3 pages).

(Continued)

*Primary Examiner* — Jonathan R Messmore
(74) *Attorney, Agent, or Firm* — Lewis Roca Rothgerber Christie LLP

(57) ABSTRACT

An along track imaging device. The device includes: a plurality of optical sensors positioned in parallel with each other and perpendicular to a direction of travel of the imaging device or an object for continuously capturing a plurality of images from the object, wherein each of the plurality of optical sensors includes a flat optic lens with a narrow angle of view; an imaging sensor coupled to the plurality of optical sensors for sensing the plurality of captured images and generating a plurality of overlaid images; a processor coupled to the imaging sensor for compositing the plurality of overlaid images into a single composite image; a digital storage medium for storing a plurality of composite images in series as a contiguous along track image; and a display device for displaying the contiguous along track image.

19 Claims, 5 Drawing Sheets

(56) References Cited

U.S. PATENT DOCUMENTS

| | | | |
|---|---|---|---|
| 2014/0267878 A1 | 9/2014 | Geelen et al. | |
| 2015/0022870 A1 | 1/2015 | Kiyota et al. | |
| 2015/0103297 A1* | 4/2015 | Lim | G02F 1/29 |
| | | | 349/122 |
| 2017/0038571 A1* | 2/2017 | Daugela | G02B 17/0856 |
| 2017/0161561 A1* | 6/2017 | Marty | G06K 9/00724 |
| 2017/0340202 A1* | 11/2017 | Roorda | A61B 3/1025 |
| 2018/0176541 A1* | 6/2018 | Abbas | G06T 3/4053 |

OTHER PUBLICATIONS

Written Opinion of the International Searching Authority dated Jul. 31, 2018 for corresponding PCT Application No. PCT/US2018/027355 (7 pages).

\* cited by examiner

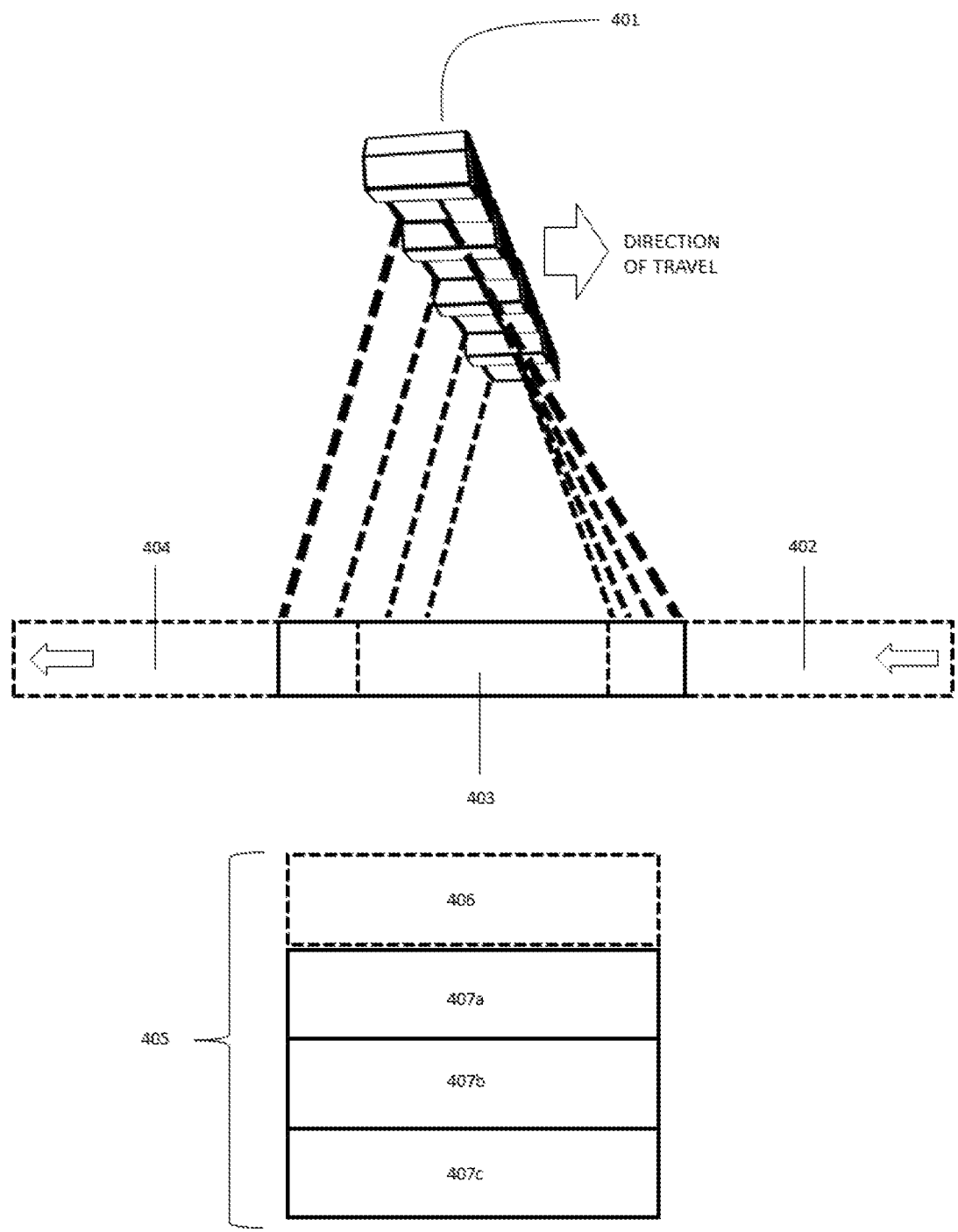

ALONG TRACK FLAT OPTICAL LENS IMAGING DEVICE

CROSS-REFERENCE TO RELATED APPLICATIONS

This Patent Application claims the benefits of U.S. Provisional Patent Application Ser. No. 62/484,827, filed on Apr. 12, 2017 and entitled "Along Track Flat Optical Lens Imaging Device," the entire content of which is hereby expressly incorporated by reference.

FIELD OF THE INVENTION

The disclosed invention generally relates to optical lenses and more specifically to an along track flat optical lens imaging device.

BACKGROUND

Traditionally, along track scanning is a remote sensing technology for obtaining images with spectroscopic sensors. Typically, spectroscopic sensors are used for along track scanning, however, photographic sensors operating to capture images in the visible light spectrum are not used, because the object being imaged must be focused through a lens onto the image sensor. The along track scanners are typically used for passive remote sensing from space and for various spectral analysis, for example, on production lines with near-infrared spectroscopy used to identify properties of objects. Moreover, along track scanners may also be used for astronomical spectroscopy, for agriculture for determining the quality of forages, grains, and other products, for remote monitoring or investigation of plants and soils where data is collected from instruments on airplanes or satellites to assess ground cover and soil chemistry, for material science to determine the optical characteristics of nanoparticles, and for medical uses to assess oxygenation and microvascular function in the brain and tissues.

In orbital along track sensors, photographic sensors are not typically used to image different areas of the surface of the Earth because of the large amount of geometric distortion caused by the imaging characteristics of all curved lenses. These lens and imaging sensor combinations are not typically used in along track sensors. Any geometric distortion creates an inaccurate representation of the object being imaged. Due to the aforementioned limitations with wide field of view lenses, photo imaging sensors have not been able to accurately collect images using along track imaging.

SUMMARY OF THE INVENTION

In some embodiments, the disclosed invention is an along track flat optical lens imaging device that uses an array of narrow angle of view low distortion lens and sensor combinations that overlap their angles of view to image an object as opposed to a single lens device imaging an object. When each lens system has very low distortion, it is possible to combine the images together rapidly and accurately in a way that has very low distortion, and very high resolution.

In some embodiments, the disclosed invention is an along track imaging device. The device includes: a plurality of optical sensors positioned in parallel with each other and perpendicular to a direction of travel of the imaging device or an object for continuously capturing a plurality of images from the object, wherein each of the plurality of optical sensors includes a flat optic lens with a narrow angle of view; an imaging sensor coupled to the plurality of optical sensors for sensing the plurality of captured images and generating a plurality of overlaid images; a processor coupled to the imaging sensor for compositing the plurality of overlaid images into a single composite image; a digital storage medium for storing a plurality of composite images in series as a contiguous along track image; and a display device for displaying the contiguous along track image. At least one of the plurality of optical sensors has an angle of view of less than 5 degrees, and image distortion of less than 2 percent.

In some embodiments, the disclosed invention is a imaging method for capturing a continuous image of a moving object. The method includes: positioning a plurality of optical sensors in parallel with each other and perpendicular to a direction of travel of the object, wherein each of the plurality of optical sensors includes a flat optic lens; continuously capturing a plurality of images from the object, with a narrow angle of view; sensing the plurality of captured images by an imaging sensor; generating a plurality of overlaid images from the plurality of captured images; compositing the plurality of overlaid images into a single composite image; storing a plurality of composite images in series as a contiguous along track image; and displaying the contiguous along track image. At least one of the plurality of optical sensors has an angle of view of less than 5 degrees, and image distortion of less than 2 percent.

BRIEF DESCRIPTION OF THE DRAWINGS

A more complete appreciation of the disclosed invention, and many of the attendant features and aspects thereof, will become more readily apparent as the disclosed invention becomes better understood by reference to the following detailed description when considered in conjunction with the accompanying drawings in which like reference symbols indicate like components.

FIG. 4 is a perspective diagram of flat optics along track scanning device, according to some embodiments of the disclosed invention.

DETAILED DESCRIPTION

Figure 1:
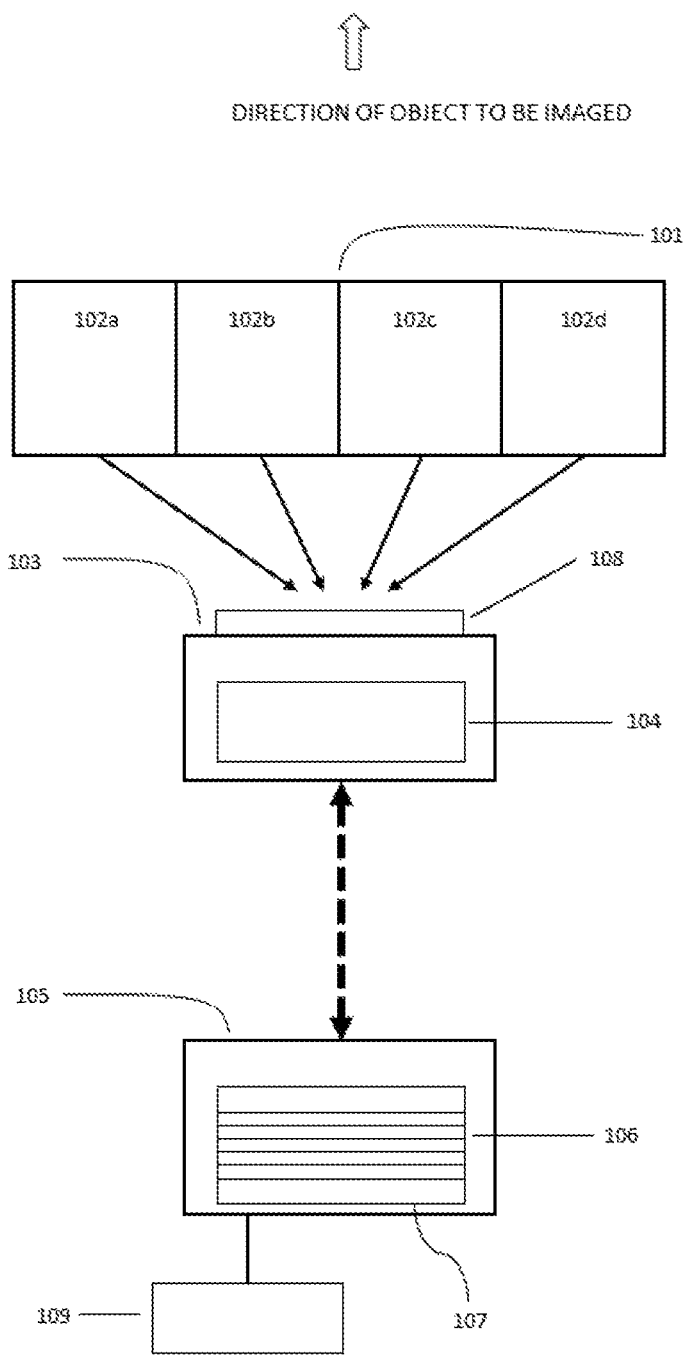
FIG. 1 is a diagram of a flat optics along track scanning device, according to some embodiments of the disclosed invention.

In some embodiments, the disclosed invention is a device for scanning an object with an array of overlapping angle of view flat optical lenses each attached to a camera sensor that produces images without geometric distortion. These images are then overlapped and composited together to create a continuous image of the areas previously imaged.

Various aspects of the disclosed invention solve many of the issues presented by using curved lenses with geometric distortion. A device according to the disclosed invention images an object with a series of flat optic lenses that contain no geometric distortion of the object being imaged. The device according to the disclosed invention travels along a track while compositing currently captured images with previously captured images, without the aid of image enhancement to correct geometric distortion. This allows for photo imaging sensors to be used for along track imaging by using photographic visible light imaging sensors in conjunction with flat lens optics. The disclosed invention renders the need for correcting geometric distortion in collected imagery unnecessary.

In some embodiments, the disclosed invention comprises a novel along track imaging device including a row of flat optics lenses coupled with photographic image sensors. These devices are referred to as flat optics sensors and the arrangement of devices is referred to as a sensor array.

In some embodiments, the flat optics sensors of the sensor array are situated perpendicular to the direction of travel. This way, the sensor array captures objects beneath its gaze at a nadir position as it travels forwards. The captured frames from each of the flat optics sensors are overlapped and composited together to create an image. The captured image is then added to the previously captured composited image and the process is repeated. The result is contiguous series of images.

Without image correction for lens distortion, images can be more rapidly captured and compressed and utilize compression algorithms that take longer rather than allocate that time to post-processing. Eliminating the post-processing step for correction of lens distortion can allow for better or more efficient energy usage from a battery powered device. This also allows for longer use time and can be applied to hand-held devices, satellites, or any other devices that have power supply limitations. Accurately capturing data without lens distortion also allows for accurate mensuration of imagery. In some embodiments, when post-processing is not required, measurements can be performed in near real time or directly on the device. Onboard or ground based processors are then better utilized for image enhancements and post-processing, instead of correcting for lens distortion. Some of these better utilizations of processor(s) include: processing larger file sized images rapidly, imaging using multispectral or hyperspectral sensors (data cube), high dynamic range imaging, object identification through artificial intelligence (AI), and the like.

FIG. 1 is a diagram of a flat optics along track scanning device, according to some embodiments of the disclosed invention. As shown, the flat optics along track imaging device includes a number of optical sensors 102a-102d that are positioned in parallel with each other and perpendicular to the direction of travel, that is, up-down direction in the depicted diagram.

In these embodiments, each of the optical sensors 102a-102d includes a flat optic lens that is free of geometric distortions and has a narrow angle of view. The range of the narrow angle of view is typically determined by the aperture, focal length of the lens and the format of the sensor. In some embodiments, the angle of view is not more than 5 degrees and image distortion caused by the curvature of the lens is 2 percent or less and the system has the desired spatial resolution of a portion of the object being imaged. The narrow angle of view lens is coupled with an imaging sensor 108 that may include a charge coupled device (CCD), a complementary metal-oxide semiconductor (CMOS), or similar imaging devices. Each flat optic lens captures an image of an object nadir to the array's position and then projects the collected distortion-free image to the imaging sensor 108, which in some embodiments may be positioned within the housing of the flat optical sensors 102a-102d. The sensor array 101 continuously captures and submits images from each flat optical sensor 102a-102d simultaneously. The images are then submitted to a processor 103 (e.g., an onboard processor) and associated circuitry, including memory and input/output circuits, that further composite (using known software methods) the overlapping images taken by the several flat optical lens and sensor couplings into a single composite image 104.

In some embodiments, each image is composited using a mathematical model that relates pixel coordinates in one image to the pixel coordinates in its neighboring unit's image. The final composite image 104 is then transmitted to a receiver system 105. In an example of an onboard a satellite, the receiver system 105 may be a terrestrial receiver located on a planet's surface, or an onboard receiver located on the body of a satellite. A digital storage medium 106 within the receiver system 105 stores the composite images in series as a contiguous along track image 107 for as long as the sensor array 101 is capturing images. The contiguous along track image 107 may then be displayed o the display unit 109.

Figure 2A:
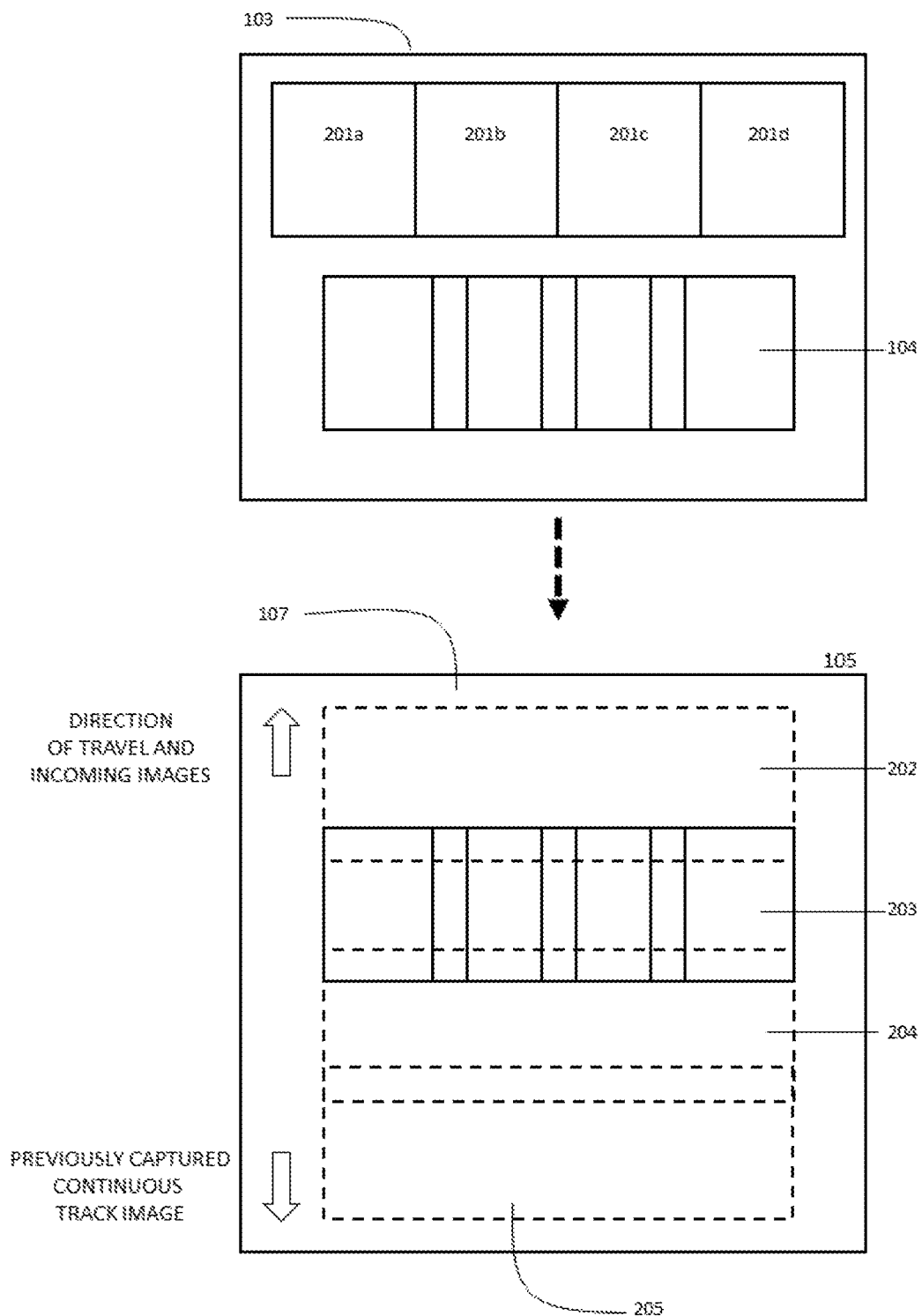
FIG. 2A is a diagram displaying the detailed view of flat optics along track image processing and composition, according to some embodiments of the disclosed invention.

FIG. 2A depicts a further detailed view of flat optics along track image processing and composition, according to some embodiments of the disclosed invention. A sensor array 103 continuously captures and submits images (201a-201d) from each flat optical sensor (for example, 102a-102d in FIG. 1) in unison. The images are submitted to a processor (e.g., processor 103 in FIG. 1) that further composites (using known methods in the art) the overlapping terrain images taken by the several flat optical sensors into a single composite image 104. In some embodiments, each image is composited by known software routines using a mathematical model that relates pixel coordinates in one image to the pixel coordinates in its neighboring unit's image. This method corrects images from a secondary image to those of a primary image in a process known as image registration. In the image registration process, images are aligned and overlapped utilizing distinctive features and pixels found in each image. Once this image correspondence is established, another known process applies a seamless blending (stitching) of the edges of each image to create a long strip image known as a composited image 104. The composited image 104 is then transmitted to a receiver 105.

The receiver 105 receives the composite image as an incoming composite image 202. In some embodiments, all incoming images are received before being composited into composite images 203. The system then takes the received incoming composite image 203 and aligns the received incoming composited image 203 and it's pixels with the corresponding pixels from the previously captured and neighboring received composited image 204. As the images are aligned and attached to each other, they are stored in an storage medium to form a contiguous track image 205. The continuous track image 205 contains all images captured with the device from the beginning of the period of time which the system has been capturing images. The continuous track image 205 is then stored in the storage medium.

Figure 2B:
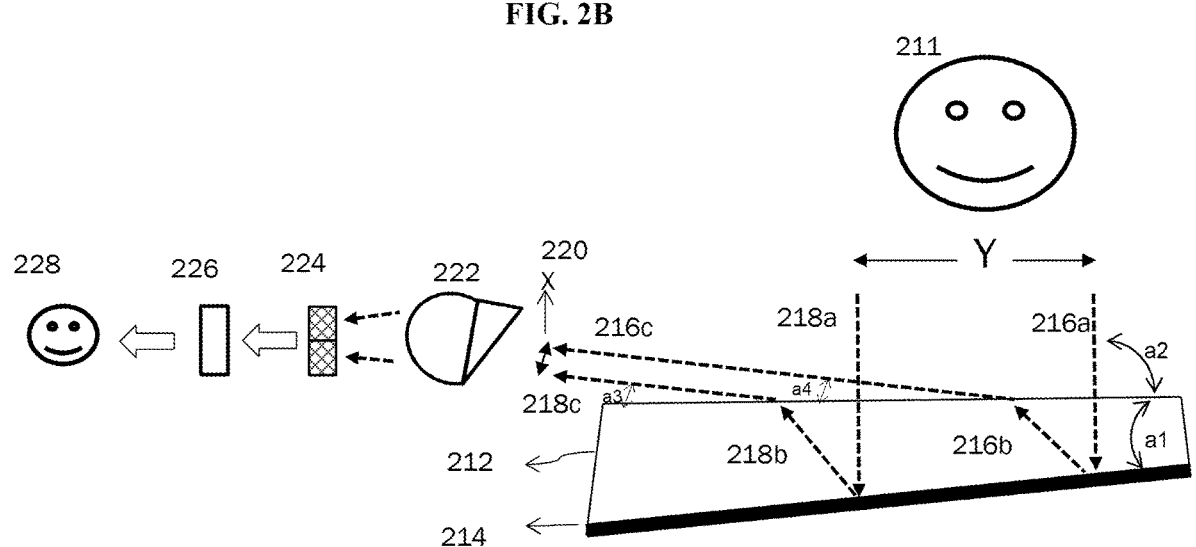
FIG. 2B shows an exemplary configuration of a flat lens system, according to some embodiments of the disclosed invention.

FIG. 2B shows an exemplary configuration of a flat lens system, according to some embodiments of the disclosed invention. A wedge shaped refractive material 212 with angles a1 and a2 is formed on top of a reflective surface 214 to form a flat lens. The image of an object 221 with a width of Y is reflected from multiple surfaces of the flat (wedge) lens, processed and compressed to form a compressed image 228 of the same object. As shown, light (EM) waves 216a and 218a at the two ends of object 211 are penetrated into the refractive material 212 and reflected from the reflective surface 214 at an angle to form light waves 216*b* and 218*b*, respectively. The reflected lights (EM) 216*b* and 218*b* are further reflected from the internal surface of the refractive material 212 to form light waves 216*c* and 218*c*, respectively. The angle of the light waves 216*c* (a4) and 218*c* (a3) leaving the refractive material can be designed for specific applications, using conventional optical design methods. Reflected light waves 216*c* and 218*c* now form a smaller size X (compressed) image 220 of the original object 211.

Varying angles a1 and/or a2 will vary the size X of the compressed image 220. The size X of compressed image 220 varies with the EM wavelength, angle a1 and a2, and the type of the refractive material 212. Angles a1 and/or a2 values can be varied for specific applications, such as the degree of the compression (X) needed. In many typical applications, angles a1 is between 15 and 25 degrees and a2 is between 75 to 105 degrees. Exit beam angles of a3 and a4 can be modified by varying angles a1 and/or a2 until the critical angle is reached which then alters the beam path to total internal reflection.

Referring back to FIG. 2B, the compressed image is then directed to an optional focusing lens 222 to focus the compressed image onto light sensor(s) 224 (for example, CCD or CMOS sensor(s)). In some embodiments, the focusing lens 222 focuses the compressed image onto an eyepiece for viewing by a human. An image processor 226 (implemented in software, hardware and/or firmware) corrects for any aberrations resulting from the lens system by using one or more image processing techniques. An example of correcting chromatic aberrations in hardware would be the use of one or more optical wedges and/or diffraction gratings, before the light sensor 224, that together have an achromatic effect for imaging. The refractive properties of the material of the wedge 212 can be changed to assist in controlling chromatic dispersion for imaging applications as well. For example, the refractive index of the wedge can be dynamically changed by applying voltage to current to the wedge comprised of certain material that refract the light differently under electric power.

In some embodiments, the chromatic dispersion for the output image is dynamically measured (for example, at predetermined intervals) and a corresponding voltage (or current) is applied to the wedge to change its refractive index and/or its beam absorption to compensate for the measured chromatic dispersion. In some embodiments, the amount of the voltage (or current) applied to the wedge is determined from a stored lookup table, taking into account the measured chromatic dispersion and the type of the wedge material.

The refractive material 212 may be made of any type of glass, plastic, fluids such as water, or similar types of refractive materials. In case of a fluid, such as water, the fluid may also be used to allow cooling of the optics. The reflective surface 214 may be any type of mirror or other material having a reflective surface. Such reflective surface may be attached or coated on such material to form the reflective surface 214.

The flat lens of the disclosed invention may have any rectangular shape, rather than a square shape, which allows for variable compression ratio and aspect ratio of the image being formed. In some embodiments, the wedge angles a1 and a2 can be variable as the specific applications require. For example, using common BK7 glass, a typical wedge angle a2 may vary between 75 and 105 degrees, in some embodiments. Choosing an angle a2 closer to 75 degrees will result in higher energy captured and lower chromatic aberration but have lower compression. However, choosing an angle a2 closer to 105 degrees results in a higher compression of the image at the expense of higher energy losses and larger chromatic effects. Angle a1 can be varied to produce similar effects. A more detail description of the flat lens is described in the U.S. Pat. No. 9,759,900, entitled "Flat Wedge Shaped Lens and Image Processing Method," the entire content of which is hereby expressly incorporated by reference.

Figure 3:
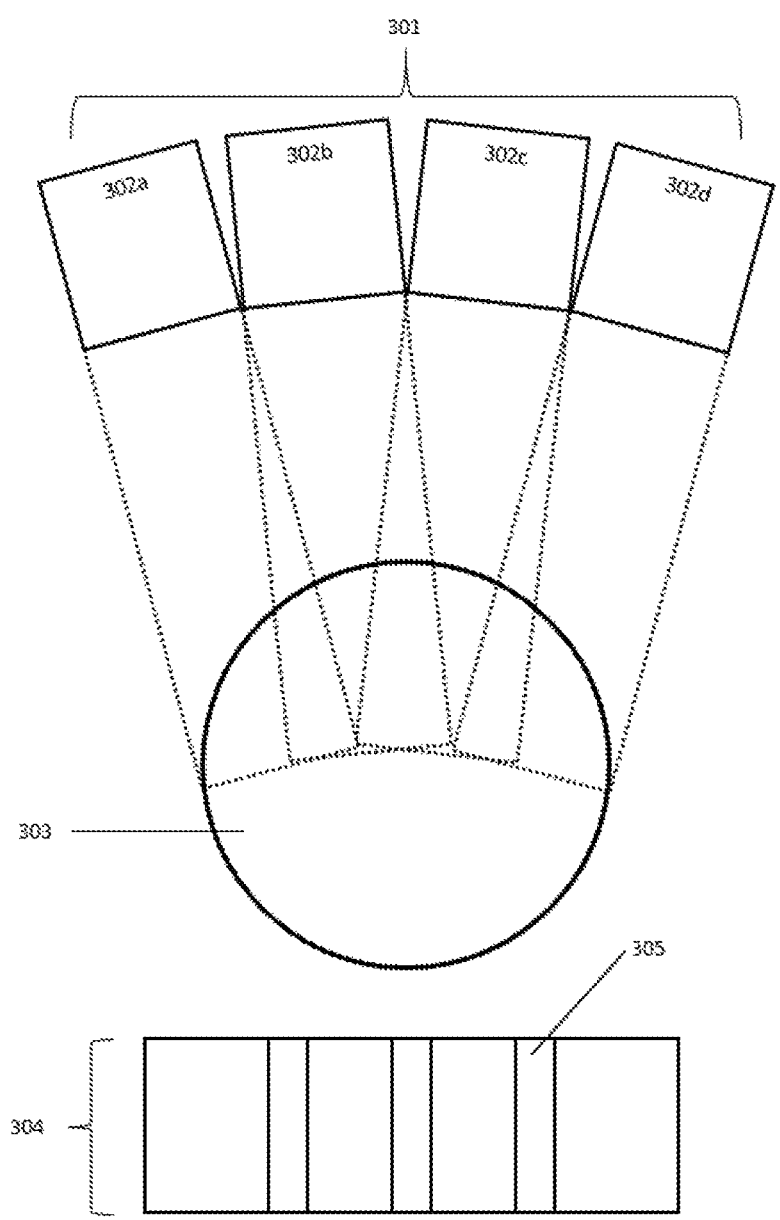
FIG. 3 illustrates an array of flat optic lens and sensor combinations, each with a narrow and overlapping angle of view, according to some embodiments of the disclosed invention.

FIG. 3 illustrates an array of flat optic lens and sensor combinations, each with a narrow angle of view, focusing on an object while overlapping their angles of view to capture and image as a unit, according to some embodiments of the disclosed invention. In these embodiments, the flat optical sensors 302*a*-302*d* are positioned in a sensor array 301. The sensor array 301 is comprised of several narrow angle of view imaging lens and sensor combinations positioned in an arch configuration forcing overlapping angles of view. The angle of offset of each of the lens and sensor combinations in the arch is a function of the distance of the array from the object being imaged and the size of the object being imaged in relation to the size of the array. Therefore, depending on the distance of the array from the object and the size of the object, the offset angle may be determined or dynamically changed. For example, if the next object to be imaged is larger than the previous object, the offset angle can be increased automatically be one or more servo motors separating the optical sensors.

This arch configuration and the positioning or mounting of the sensors at angles to each other allows for the angles of view of the sensors to overlap each other. This configuration allows for overlapped angles of view while focused on an object 303 as a focal point. One of the advantages of these embodiments is that the object 303 is able to be imaged in greater detail and from angles unavailable from a single lens and sensor configuration. The flat optical sensors 302*a*-302*d* in the array 301 collectively image the object 303 to capture an image that aligns and overlaps to create a composite image 304.

Each individual flat optical sensor 302*a*-302*d* focuses and images a portion of the object 303, while overlapping the angle of view with that of its neighboring sensor, while the neighboring sensor also overlaps its angle of view with its other neighboring sensor. The other neighboring sensor also overlaps its angle of view with its subsequent neighboring sensor, until all sensors share an overlapping angle of view. Although, for the purpose of simplicity, only four sensors are shown and used in this example, these embodiments are capable of utilizing as many sensor as necessary to collect a complete image. The depicted area 305 is an example of the overlap area of two square images when viewed from above. An image is captured simultaneously from each sensor in the array 301 and then aligned and overlapped by software utilizing distinctive features and pixels found in each image and create a composited image 304. The composited image is then aligned and overlapped with previously captured composited images to create a continual track image free of distortion.

FIG. 4 is a perspective diagram of flat optics along track scanning device including an array of narrow angle of view flat optics with overlapping angles of view that are focused on an object while moving along an imaging track, according to some embodiments of the disclosed invention. As shown, an array of sensor and lens combinations 401 travels in a forward direction while scanning the object directly nadir to a sensor array 403. The array of narrow angle of view optics are overlapped in angle of view with each other. In some embodiments, the array of sensor and lens combinations 401 can be held still while the object 403 nadir to the imaging array 403 is moved under and passes the imaging array 401. The array of sensor and lens combinations 401 captures simultaneous images from the object 403 that are then aligned and overlapped to create a larger image. The array of sensor and lens combinations 401 scans a section of the object 403, while compositing the image captured with a previously scanned section 404 of the object 403 by using software to align and overlap images utilizing distinctive features and pixels found in each image.

The scanning array moves in the direction of travel or the object is moved from the direction of travel to capture the next area of the object 402 to be imaged. The captured image of the scanned section 403 is then be aligned to the incoming image of the ground ahead of the target 402. Utilizing software, a contiguous image 405 is created of the object being imaged. In some embodiments, the contiguous image is created by incoming images 406 aligned and overlapped with previously captured images 407a-407c utilizing distinctive features and pixels found in each previously captured image. Known software routines are used to align, and overlap captured composited images 406 utilizing distinctive features and pixels found in each image with previously captured composited images 407a-407c to create a continual track image free of distortion.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

The invention claimed is:

1. An along track imaging device comprising:
   a plurality of optical sensors for continuously capturing a plurality of images from an object, wherein each of the plurality of optical sensors includes a flat optical lens and has an angle of view of less than 5 degrees;
   a single imaging sensor coupled to each of the plurality of optical sensors for sensing the plurality of captured images projected thereon and generating a plurality of overlaid images;
   a processor coupled to the imaging sensor for compositing the plurality of overlaid images into a single composite image; and
   a non-transitory digital storage medium for storing a plurality of composite images in series as a contiguous along track image.

2. The along track imaging device of claim 1, wherein the plurality of optical sensors are stationary and the object is moving.

3. The along track imaging device of claim 1, wherein the object is stationary and the plurality of optical sensors are moving.

4. The along track imaging device of claim 1, wherein the processor composites the plurality of overlaid images into a single composite image by aligning and overlapped the plurality of overlaid images utilizing distinctive features and pixels found in each overlaid image.

5. The along track imaging device of claim 1, wherein each of the flat optic lenses includes a wedge-shaped refractive material for refracting incident light beams from the object; and a reflective material positioned at the second surface of the wedge-shaped refractive material for reflecting the refracted light beams toward the first surface.

6. The along track imaging device of claim 1, wherein each of the flat optic lenses compresses the image of the object.

7. The along track imaging device of claim 1, wherein each of the flat optic lenses expands the image of the object.

8. The along track imaging device of claim 5, further comprising an electric energy source electrically coupled to the wedge-shaped refractive material to dynamically change a refractive index of the refractive material to refract the incident light beams at varying angles.

9. The along track imaging device of claim 1, wherein an angle of view of each of the plurality of optical sensors overlaps with the angle of view of other optical sensors.

10. The along track imaging device of claim 1, wherein each of the plurality of optical sensors is positioned in an arch configuration with respect to a neighboring optical sensor for capturing the plurality of images from the object.

11. The along track imaging device of claim 10, wherein an offset angle of each of the optical sensors in the arch configuration is a function of a distance of the plurality of optical sensors from the object and a size of the object.

12. An imaging method for capturing a continuous image of a moving object, the method comprising:
    positioning a plurality of optical sensors on a platform, wherein each of the plurality of optical sensors includes a flat optical lens and has an angle of view of less than 5 degrees;
    continuously capturing a plurality of images from the object, with a narrow angle of view;
    projecting onto and sensing the plurality of captured images by a single imaging sensor;
    generating a plurality of overlaid images from the plurality of captured images;
    compositing the plurality of overlaid images into a single composite image;
    storing a plurality of composite images in series as a contiguous along track image; and
    displaying the contiguous along track image.

13. The imaging method of claim 12, wherein compositing the plurality of overlaid images into a single composite image is performed by aligning and overlapped the plurality of overlaid images utilizing distinctive features and pixels found in each overlaid image.

14. The imaging method of claim 12, wherein each of the flat optic lenses compresses the image of the object.

15. The imaging method of claim 12, wherein each of the flat optic lenses expands the image of the object.

16. The imaging method of claim 12, further comprising dynamically changing a refractive index of the flat optic lenses to refract incident light beams at varying angles.

17. The imaging method of claim 12, wherein angle of views of the plurality of optical sensors are overlapping.

18. The along track imaging device of claim of claim 1, wherein the plurality of optical sensors are positioned in parallel with each other and perpendicular to a direction of travel of the imaging device or the object.

19. The along track imaging device of claim of claim 1, wherein the single imaging sensor is a charge coupled device (CCD).

* * * * *